United States Patent [19]

Kuga

[11] Patent Number: 5,701,131
[45] Date of Patent: Dec. 23, 1997

[54] DISPLAY APPARATUS

[75] Inventor: Kaeko Kuga, Kyoto, Japan

[73] Assignee: Rohm Co., Ltd., Kyoto, Japan

[21] Appl. No.: 413,862

[22] Filed: Mar. 29, 1995

[30] Foreign Application Priority Data

Mar. 30, 1994 [JP] Japan .................. 6-060414

[51] Int. Cl.⁶ .................................................. G09G 5/00
[52] U.S. Cl. ................................................ 345/8; 345/156
[58] Field of Search ........................ 345/7, 8, 9, 31, 345/32, 156–162; 324/162

[56] References Cited

U.S. PATENT DOCUMENTS

| | | | |
|---|---|---|---|
| 4,942,668 | 7/1990 | Franklin | 33/336 |
| 5,068,645 | 11/1991 | Drumm | 340/710 |
| 5,321,416 | 6/1994 | Bassett et al. | 345/8 |
| 5,365,671 | 11/1994 | Yaniger | 33/336 |
| 5,373,857 | 12/1994 | Travers et al. | 128/782 |
| 5,392,112 | 2/1995 | Nakamura | 356/139 |
| 5,442,734 | 8/1995 | Murakami et al. | 395/127 |
| 5,525,901 | 6/1996 | Clymer et al. | 324/207 |
| 5,526,022 | 6/1996 | Donahue et al. | 345/156 |

Primary Examiner—Richard Hjerpe
Assistant Examiner—David L. Lewis
Attorney, Agent, or Firm—Nikaido Marmelstein Murray & Oram LLP

[57] ABSTRACT

A display apparatus is provided which displays a natural image in accordance with the upward and downward direction of the display apparatus. The display apparatus is provided with an inclination detecting unit, a memory which stores data of an image which is wide in the upward and downward direction, and a controller which displays only a partial area of the image. The inclination detecting unit includes a light emitting device which emits light in a direction varying according to the direction of the display apparatus and light receiving devices whose directions are maintained constant due to the gravity irrespective of the direction of the display apparatus. The inclination detecting unit detects an inclination based on the light incident position on the light receiving device. The controller determines the position in the upward and downward direction of the image area to be displayed in accordance with the detected inclination.

8 Claims, 5 Drawing Sheets

DISPLAY APPARATUS

BACKGROUND OF THE INVENTION

1. Field of the Invention

The present invention relates to a display apparatus, and more specifically, to a display apparatus which detects the direction of gravity to display an image in accordance with the direction of gravity.

2. Description of the Prior Art

In a conventional display apparatus employed for a television set, a simulator and a video game apparatus, the entire area of the image is displayed on the display screen. For example, in shooting a video image, the direction of the video camera is decided by the shooter's intention, and an area in accordance with the angle of view of the camera is shot and video signals are recorded on the video tape. In reproducing the image, all the recorded image signals are read out from the video tape and the entire area of the shot image is displayed on the display screen. In this case, the image displayed on the screen is decided at the time of shooting and is completely irrelevant to the position and direction of the viewer of the image.

In the simulator and the video game apparatus, it is preferable that an image corresponding to the position and the direction of the eyes of the viewer is displayed to increase realism. In the conventional display apparatus, however, since the image of an area decided at the time of shooting is always displayed, the viewer of the image cannot feel a sufficient realism. In recent years, a head mounted display (HMD) which is put on the viewer's head to display an image before the viewer's eyes has spread so that image viewing is readily performed. However, when the displayed image disagrees with the direction of the user's head, the user feels unnaturalness.

For example, if an image of a bird flying in the sky which is shot from below is displayed when the user wearing the HMD looks downward, the disagreement between the direction of the user's head and the image is great so that the user feels unnaturalness. Conversely, if an image which is shot from above is displayed when the HMD wearer looks upward, the user also feels unnaturalness.

SUMMARY OF THE INVENTION

An object of the present invention is to provide a display apparatus which displays a natural image in accordance with the upward and downward direction of a display panel.

To achieve the above-mentioned object, a display apparatus of the present invention is provided with a display panel which displays an image, inclination detecting means for detecting an inclination of a panel surface of the display panel relative to a direction of gravity, and image extracting means for extracting a data of a part of an image area from image data to display an image of the extracted data on the display panel and for deciding a position in an upward and downward direction of the image area to be extracted, based on the inclination detected by the inclination detecting means.

The inclination detecting means includes a light emitting device, a plurality of light receiving devices arranged in an array for receiving light from the light emitting device, an optical device which reflects the light from the light emitting device toward the light receiving devices, a fixed supporting member which integrally holds the display panel and the optical device, a swingable supporting member which holds the light receiving devices and is swingable about the optical device along a direction of arrangement of the light receiving devices, a weight fixed to the swingable supporting member for maintaining a direction of the swingable supporting member to be constant relative to the direction of gravity, and an inclination sensor which detects an inclination of the fixed supporting member relative to the direction of gravity based on a position of the light receiving device receiving the light from the light emitting device. The light emitting device is held by either the fixed supporting member or the swingable supporting member.

In this arrangement, when the upward and downward direction of the fixed supporting member varies, the directions of the display panel and the optical device vary in completely the same manner. On the other hand, the direction of the swingable supporting member is always maintained constant relative to the direction of gravity by the weight, so that the directions of the fixed supporting member and the swingable supporting member relative to each other vary. The light from the light emitting device reflected by the optical device is incident on a different light receiving device according to the variation of upward and downward direction of the fixed supporting member. The inclination sensor detects an inclination of the fixed supporting member relative to the direction of gravity based on a light incident position on the light receiving device. Since the display panel is held by the fixed supporting member, an inclination of the panel surface relative to the direction of gravity is detected.

The image extracting means extracts a data of a front image area when the display panel surface is parallel to the direction of gravity and extracts a data of an upper or a lower image area when the display panel surface inclines upward or downward, so that a natural image corresponding to the upward and downward direction of the display panel is displayed.

The inclination detecting means may be designed such that the optical device which reflects the light from the light emitting device is not used and that the light from the light emitting device is directly received by the light receiving device. In this case, the swingable supporting member which holds the light receiving devices arranged in an array is arranged so that its center of swing agrees with the position of the fixed light emitting device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
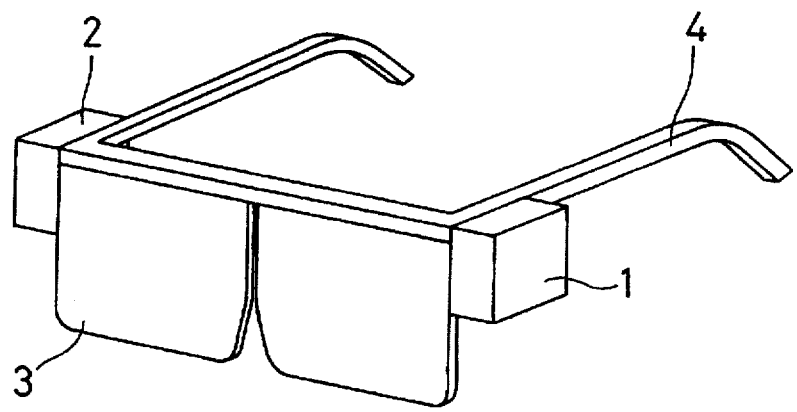
FIG. 1 shows the appearance of an HMD of a first embodiment of the present invention.

A first embodiment of a display apparatus of the present invention will be described with reference to the drawings. Referring to FIG. 1, there is shown the appearance of an HMD employing the display apparatus of the present invention. The HMD takes the form of a goggle and provided with a liquid crystal panel 3 for displaying an image and an attachment member 4 for attachment to the head. At the sides of the liquid crystal panel 3, an inclination detecting unit 1 which detects an inclination of the panel surface of the liquid crystal panel 3 relative to the direction of gravity and a controlling unit 2 are provided, respectively.

Figure 2:
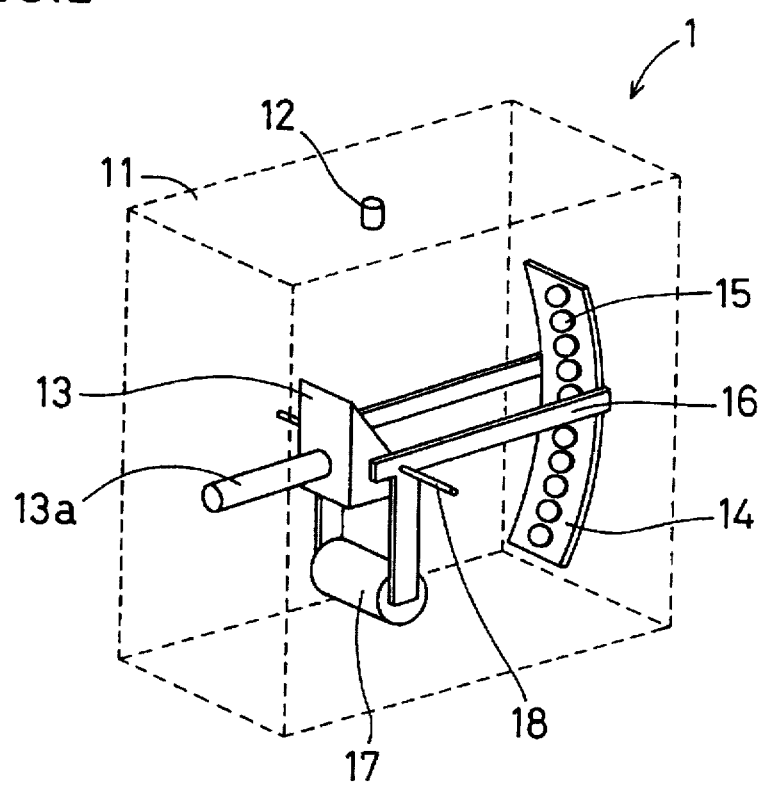
FIG. 2 shows the arrangement of an inclination detecting unit of the first embodiment.

Referring to FIG. 2, there is shown the arrangement of the inclination detecting unit 1. The inclination detecting unit 1 includes a frame 11, a light emitting device 12, a prism 13, a supporting member 14 which is longer in the upward and downward direction, a plurality of light receiving devices 15 arranged in an array on the supporting member 14, arms 16 which support the supporting member 14, a weight 17 fixed to the arms 16 and a shaft 18. The light emitting device 12 is fixed to the upper wall of the frame 11 and the prism 13 is fixed to the frame 11 through a supporting rod 13a. The light emitting device 12 emits a thin luminous flux toward the prism 13. The light is reflected at a predetermined position on a surface of the prism 13 and incident on one of the light receiving devices 15. The light receiving device 15 outputs an electric signal when the light reflected by the prism 13 is incident thereon.

The shaft 18 is fixed to the side walls of the frame 11. The predetermined position on the prism 13 at which the light from the light emitting device 12 is reflected is set to be located on an extension of the shaft 18. The arms 16 are arranged to be pivotable about the shaft 18. With the pivot of the arms 16, the weight 17 swings horizontally and the supporting member 14 swings upward and downward. The supporting member 14 is formed to arc about the shaft 18 and the light receiving devices 15 are equally spaced in the upward and downward direction on an inner surface of the supporting member 14. In addition, the light emitting device 12, the prism 13 and the light receiving devices 15 are arranged to be located on the same vertical.

The frame 11 is fixed to a side of the liquid crystal panel 3 so that the shaft 18 is horizontal and parallel to the panel surface of the liquid crystal panel 3.

In the inclination detecting unit 1 having the arrangement described above, the upward and downward directions of the frame 11, and the light emitting device 12 and the prism 13 fixed to the frame 11 vary according to the variation of upward and downward direction of the HMD wearer's head. On the other hand, the directions of the supporting member 14, the arms 16 and the weight 17, which are swingable about the shaft 18, are maintained constant by the gravity applied to the weight 17. That is, while the inclinations of the light emitting device 12 and the prism 13 relative to the direction of gravity vary, the inclination relative to the direction of gravity of the supporting member 14 which supports the light receiving devices 15 does not vary. Consequently, the light from the light emitting device 12 reflected by the prism 13 is incident on a different light receiving device according to the upward and downward direction of the HMD wearer's head.

Figure 3A:
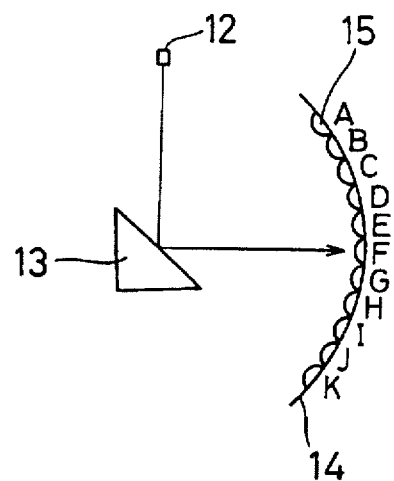
FIG. 3A shows a light incident position on a light receiving device when the HMD of the first embodiment is set horizontally.
Figure 3B:
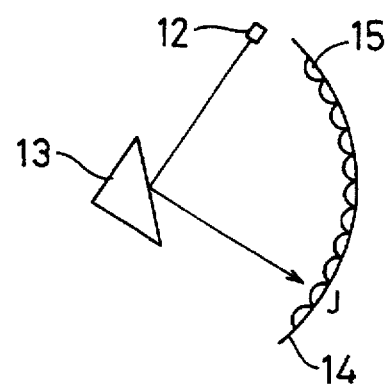
FIG. 3B shows a light incident position on a light receiving device when the HMD of the first embodiment is set in an upward direction.
Figure 3C:
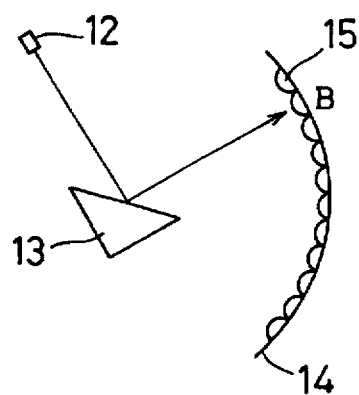
FIG. 3C shows a light incident position on a light receiving device when the HMD of the first embodiment is set in a downward direction.

Referring to FIGS. 3A to 3C, there are shown relationships between the upward and downward direction of the HMD and the light incident position on the light receiving device 15. Reference designations A to K represent positions of the light receiving devices 15 on the supporting member 14. FIG. 3A shows a condition where the HMD wearer looks to the front, i.e. faces in the horizontal direction. The liquid crystal panel 3 is substantially parallel to the direction of gravity. At this time, the light emitted from the light emitting device 12 is reflected in the horizontal direction by the prism 13 and incident on the light receiving device 15 located at a position F at the center in the upward and downward direction.

FIG. 3B shows a condition where the HMD wearer looks above the front. At this time, although the directions of the light receiving devices 15 are maintained the same as those of Fig. 3A, the directions of the light emitting device 12 and the prism 13 have been changed. The light from the light emitting device 12 is reflected by the prism 13 and incident on the light receiving device 15 located at a lower position J. FIG. 3C shows a condition where the HMD wearer looks below the front. Conversely to the case of FIG. 3B, the light reflected by the prism 13 is incident on the light receiving device 15 located at an upper position B.

Thus, the upward and downward direction of the HMD, i.e. the inclination of the panel surface of the liquid crystal panel 3 relative to the direction of gravity can be detected by the incident position of the light from the light emitting device 12 on the light receiving device 15.

Figure 4:
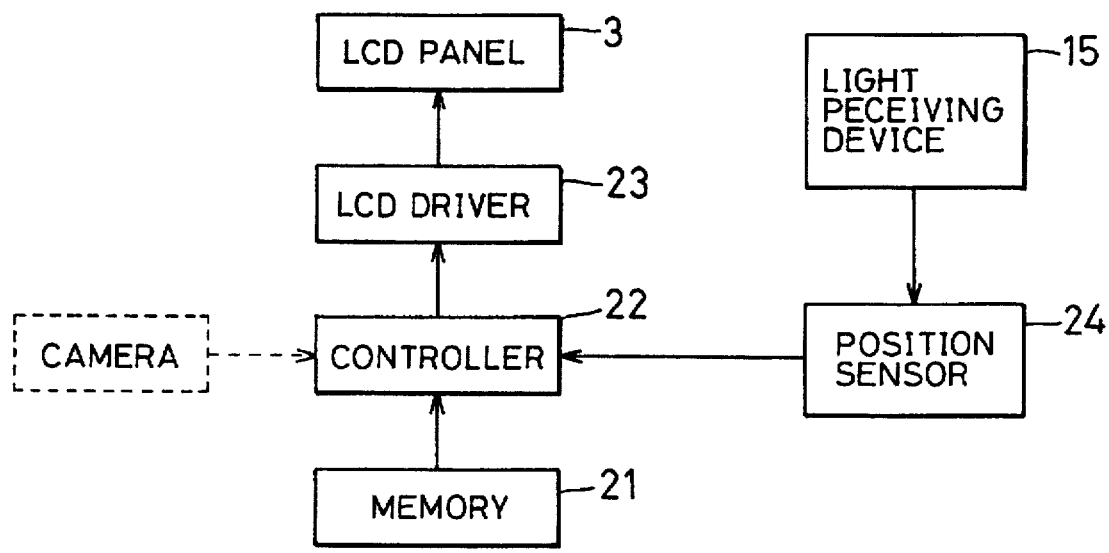
FIG. 4 is a block circuit diagram of the HMD of the first embodiment.

Referring to FIG. 4, there is shown a block diagram of the circuit arrangement of the HMD of this embodiment. Reference numeral 21 represents a memory which stores image data. Reference numeral 22 represents a controller. Reference numeral 23 represents a driver which converts the image data into video signals to display the image on the liquid crystal panel 3. Reference numeral 24 represents a position sensor which detects the light incident position on the light receiving device 15. These elements are fixed to a side of the liquid crystal panel 3 as the controlling unit 2 of FIG. 1.

The position sensor 24 detects the incident position of the light from the light emitting device 12 on the light receiving device 15 based on the output signal from the light receiving device 15, and outputs a position signal representative of the detected position to the controller 22. By detecting the incident position on the light receiving device 15 by the position sensor 24, the inclination of the inclination detecting unit 1 relative to the direction of gravity is detected, so that the inclination of the liquid crystal panel 3 relative to the direction of gravity is detected.

The memory 21 is a rewritable random access memory (RAM) which stores image data of an image area which is wider in the upward and downward direction than the area of the image displayed on the liquid crystal panel 3 at a time. As the image data, images shot by video cameras and virtual images created by computers are used. In the shooting by a video camera, a wide area can be shot at a time, for example, by using as the taking lens a wide angle lens having a wide angle of view, so that an image including upper and lower areas in addition to the front area is obtained.

The controller 22 reads out an image data from the memory 21 to display the image on the liquid crystal panel 3 through the driver 23. At this time, not the entire image including the upper and lower areas is displayed at a time but only a part of the image of a predetermined size is displayed. Specifically, of the image data read out from the memory 21, a data corresponding to an image area of a size which agrees with the longitudinal dimension of the liquid crystal panel 3 is extracted and supplied to the driver 23.

The position in the upward and downward direction of the displayed area extracted from the entire area of the image is determined based on the position signal supplied from the position sensor 24. For example, when the light from the light emitting device 12 is incident on the light receiving device 15 located at the central position F as shown in FIG. 3A, the controller 22 extracts the image data of an area located in the center in the upper and lower direction based on the position signal and supplies the data to the driver 23 to display the image on the liquid crystal panel 3. When the light is incident on the light receiving device 15 located at the lower position J as shown in FIG. 3B, the upper area of the image is displayed. Conversely, when the light is incident on the light receiving device 15 located at the upper position B as shown in FIG. 3C, the lower area of the image is displayed.

By such an extraction of a displayed area by the controller 22, an image in accordance with the upward and downward direction of the HMD is displayed on the liquid crystal panel 3, so that the HMD wearer can view an image which always agrees with the direction of his or her head.

While the prism 13 is used to reflect the light from the light emitting device 12 in this embodiment, a reflecting mirror may be used instead of the prism 13. Moreover, while the memory 21 is a RAM and incorporated in the controlling unit 2, the HMD may be designed such that image data are inputted to the controller 22 from an image data storing medium such as a laser disk placed outside the HMD. Further, as shown by the broken line of FIG. 4, the video signals of the video camera may directly be inputted to the controller 22.

Figure 5:
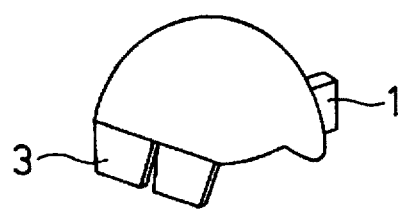
FIG. 5 shows an example of an attachment position of the inclination detecting unit to an HMD of another configuration.

The portion where the inclination detecting unit 1 is attached to the HMD is not limited to the side of the liquid crystal panel 3 shown in FIG. 1. As shown in FIG. 5, the inclination detecting unit 1 may be attached to the top or the back of the HMD which takes the form of a helmet. In this case, the direction of swing of the supporting member 14 is also set to be vertical to the liquid crystal panel 3.

A second embodiment of the HMD will be described. In the above-described first embodiment, the light emitting device 12 is fixed to the frame 11 so as to move in a manner similar to the prism 13. Therefore, the incident angle and the reflection angle of the light emitted from the light emitting device 12 relative to the prism 13 are always constant irrespective of the upward and downward direction of the HMD. In the second embodiment, the arrangement of the first embodiment is replaced by an arrangement such that the light emitting device 12 is arranged on the supporting member 14 so as to be swingable together with the light receiving devices 15. In such an arrangement, the incident angle and the reflection angle of the light from the light emitting device 12 relative to the prism 13 vary according to the upward and downward direction of the HMD, and by the variations of the angles, the reflected light can be directed to the light receiving devices 15 located at different positions according to the upward and downward direction of the HMD.

Figure 6A:
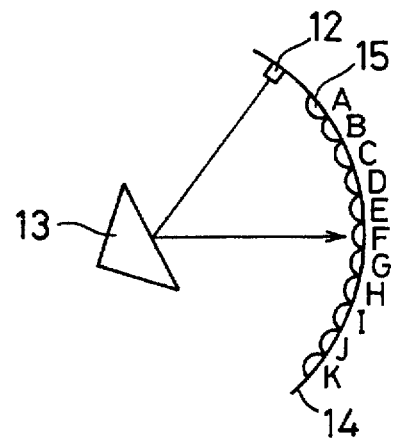
FIG. 6A shows a light incident position on a light receiving device when the HMD of a second embodiment of the present invention is set horizontally.
Figure 6B:
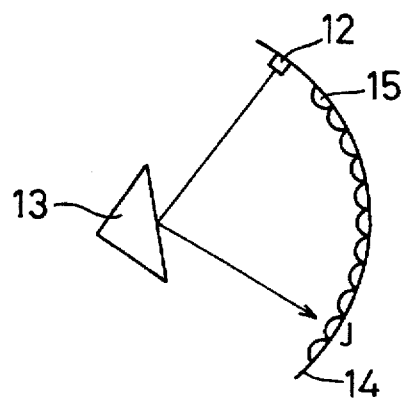
FIG. 6B shows a light incident position on a light receiving device when the HMD of the second embodiment is set in an upward direction.
Figure 6C:
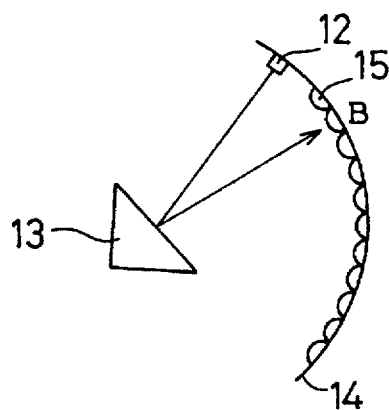
FIG. 6C shows a light incident position on a light receiving device when the HMD of the second embodiment is set in a downward direction.

Referring to FIGS. 6A to 6C, there is shown how the light receiving position varies in this embodiment. The light emitting device 12 is fixed to the supporting member 14 above the light receiving device 15 located at the uppermost position A. The prism 13 is fixed to the frame 11 at an angle different from the attachment angle shown in FIG. 2. The light emitting device 12 emits light toward the prism 13 and the light reflected by the prism 13 is incident on one of the light receiving devices 15. FIG. 6A shows a condition where the HMD wearer looks to the front. The light from the light emitting device 12 is reflected by the prism 13 and incident on the light receiving device 15 located at the position F at the center in the upward and downward direction.

FIG. 6B shows a condition where the HMD wearer looks upward. While the supporting member 14 is maintained at the same angle as that of FIG. 6A relative to the direction of gravity, the prism 13 has rotated with the rotation of the HMD. The light from the light emitting device 12 is reflected by the prism 13 and incident on the light receiving device 15 located at the lower position J. FIG. 6C shows a condition where the HMD wearer looks downward. In this case, the light from the light emitting device 12 reflected by the prism 13 is incident on the light receiving device 15 located at the upper position B.

While the variation amount of the upward and downward direction of the HMD is detected as it is in the first embodiment, in the second embodiment, since both the incident angle and the reflection angle relative to the prism 13 vary, the variation amount can be detected being doubled. For example, when the HMD wearer turns his or her head upward 10 degrees from the horizontal direction, while the direction of the light reflected by the prism 13 is turned downward 10 degrees from the horizontal direction in the first embodiment, the direction is turned downward 20 degrees from the horizontal direction in the second embodiment. Thus, the variation of direction of the HMD can more acutely be detected.

Figure 7:
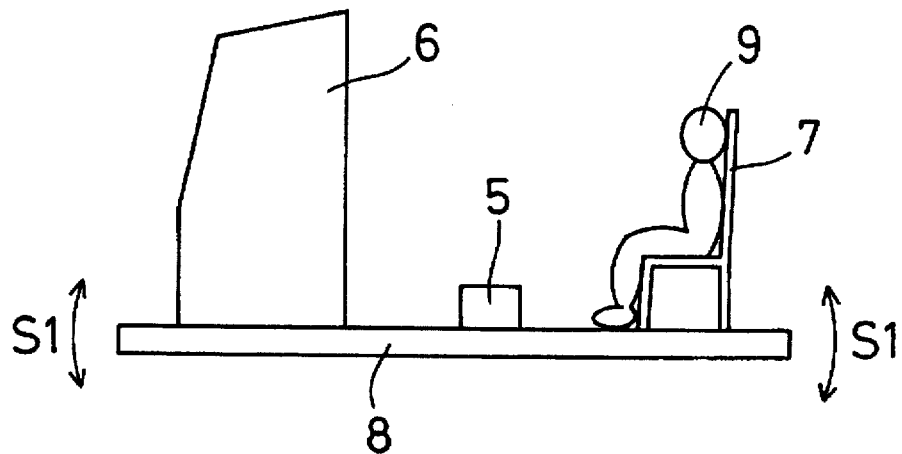
FIG. 7 schematically shows the arrangement of a display apparatus of a third embodiment of the present invention.

A third embodiment of the present invention will be described. Referring to FIG. 7, there is schematically shown the arrangement of a display apparatus of this embodiment. Reference numeral 6 represents a cathode ray tube (CRT) display which displays an image. Reference numeral 7 represents a chair on which a viewer 9 of the image on the CRT display 6 sits. Reference numeral 8 is a floor which seesaws upward and downward (i.e. in the direction shown by the arrows S1). Reference numeral 5 represents an inclination detecting unit which detects an inclination of the CRT display 6 relative to the direction of gravity. The inclination detecting unit 5, the CRT display 6 and the chair 7 are fixed to the floor 8 and pitch in accordance with the seesaw of the floor 7. The viewer 9, who sits on the chair 7 to face the CRT display 6, can always view the image in front irrespective of the seesaw of the floor 8.

Figure 8:
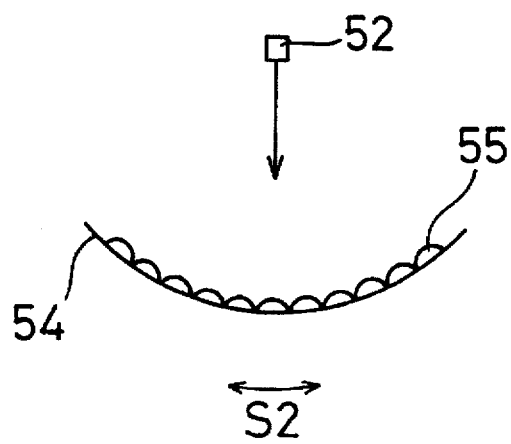
FIG. 8 schematically shows the arrangement of an inclination detecting unit of the third embodiment.

Referring to FIG. 8, there is schematically shown the arrangement of the inclination detecting unit 5. Reference numeral 52 represents a light emitting device. Reference numeral 54 represents a supporting member arranged below the light emitting device 52. Reference numeral 55 represents a plurality of light receiving devices. The light emitting device 52 is fixed by a non-illustrated fixing member. The supporting member 54 is arranged to be swingable about the light emitting device 52 in the direction of arrow S2, and the upper surface thereof is formed to arc about the light emitting device 52 along the swinging direction. The light receiving devices 55 are equally spaced in an array on the upper surface of the supporting member 54. The inclination detecting unit 5 is fixed to the floor 8 so that the swinging surface of the supporting member 54 is parallel to a straight line between the CRT display 6 and the chair 7.

When the floor 8 seesaws in the direction of arrow S1 of FIG. 7, the light emitting device 52 inclines according to the inclination of the floor 8. Since the supporting member 54 is arranged to be swingable, the direction of the supporting member 54 is always constant relative to the direction of gravity due to its own dead load. Consequently, the directions of the light emitting device 52 and the supporting member 54 relative to each other vary, so that the light from the light emitting device 52 is incident on the light receiving devices 15 located at different positions.

The circuit arrangement of this embodiment is substantially the same as that of FIG. 4, and a memory, a controller and a position sensor performing the same functions as the memory 21, the controller 22 and the position sensor 24 of the first embodiment, respectively, are provided. In addition, a driver to drive the CRT display 6 is provided. The position sensor detects the light incident position on the light receiving device 55. The controller extracts an image data from the image data stored in the memory based on the incident position to display an image of a predetermined area on the CRT display 6 through the CRT driver.

The inclination of the display surface of the CRT display 6 relative to the direction of gravity varies according to the seesaw of the floor 8. The viewer 9 sitting on the chair 7 is always located in front of the CRT display 6 and senses whether he or she faces in the horizontal direction or in the upward direction or in the downward direction by the inclination of the floor 8. In this arrangement, the upward and downward range of the image displayed on the CRT display 6 varies according to the seesaw of the floor 8, so that an image which always agrees with the direction of the viewer can be displayed.

The display apparatus of this embodiment is capable of displaying an image which agrees with the direction of gravity sensed by the viewer. As a result, when the display apparatus is employed for a simulator and a game apparatus, the user feels a high realism.

Obviously, many modifications and variations of the present invention are possible in light of the above teachings. It is therefore to be understood that within the scope of the appended claims, the invention may be practiced other than as specifically described.

What is claimed is:

1. A display apparatus comprising:

a display panel which displays an image;

inclination detecting means for detecting an inclination of a panel surface of the display panel relative to a direction of gravity; and image extracting means for extracting a data of a part of an image area from image data to display an image of the extracted data on the display panel, said image extracting means deciding a position in an upward and downward direction of the image area to be extracted, based on the inclination detected by the inclination detecting means, wherein said inclination detecting means comprises:

a light emitting device;

a plurality of light receiving devices arranged in an array for receiving light from the light emitting device;

an optical device which reflects the light from the light emitting device toward the light receiving devices;

a fixed supporting member which integrally holds the display panel and the optical device;

a swingable supporting member which holds the light receiving devices, said swingable supporting member being swingable about the optical device along a direction of arrangement of the light receiving devices;

a weight fixed to the swingable supporting member for maintaining a direction of the swingable supporting member to be constant relative to the direction of gravity; and an inclination sensor which detects an inclination of the fixed supporting member relative to the direction of gravity based on a position of the light receiving device receiving the light from the light emitting device.

2. A display apparatus according to claim 1, wherein said light emitting device is held by the fixed supporting member.

3. A display apparatus according to claim 1, wherein said light emitting device is held by the swingable supporting member.

4. A display apparatus according to claim 1, wherein said light emitting device is arranged to arc about the optical device.

5. A display apparatus according to claim 1, wherein said optical device is a prism.

6. A display apparatus according to claim 1, wherein a memory is provided which stores the image data and supplies the image data to the image extracting means.

7. A display apparatus according to claim 1, wherein said display apparatus is a head mounted display which is put on a head for use.

8. A display apparatus comprising:

a display panel which displays an image;

inclination detecting means for detecting an inclination of a panel surface of the display panel relative to a direction of gravity; and image extracting means for extracting a data of a part of an image area from image data to display an image of the extracted data on the display panel, said image extracting means deciding a position in an upward and downward direction of the image area to be extracted, based on the inclination detected by the inclination detecting means, wherein said inclination detecting means comprises;

a light emitting device;

a fixed supporting member which integrally holds the display panel and the light emitting device;

a swingable supporting member which is swingable about the light emitting device within a surface vertical to a panel surface of the display panel, a direction of said swingable supporting member being maintained constant relative to the direction of gravity due to gravity;

a plurality of light receiving devices arranged on the swingable supporting member along a direction of swing of the swingable supporting member, said light receiving devices receiving light from the light emitting device; and an inclination sensor which detects an inclination of the fixed supporting member relative to the direction of gravity based on a position of the light receiving device receiving the light from the light emitting device.

* * * * *